INVENTOR
Jack N. Saunders

Nov. 15, 1960

J. N. SAUNDERS 2,960,272

HEATING SYSTEMS

Filed Aug. 17, 1956

INVENTOR

Jack N. Saunders

BY Moore and Hall

ATTORNEYS

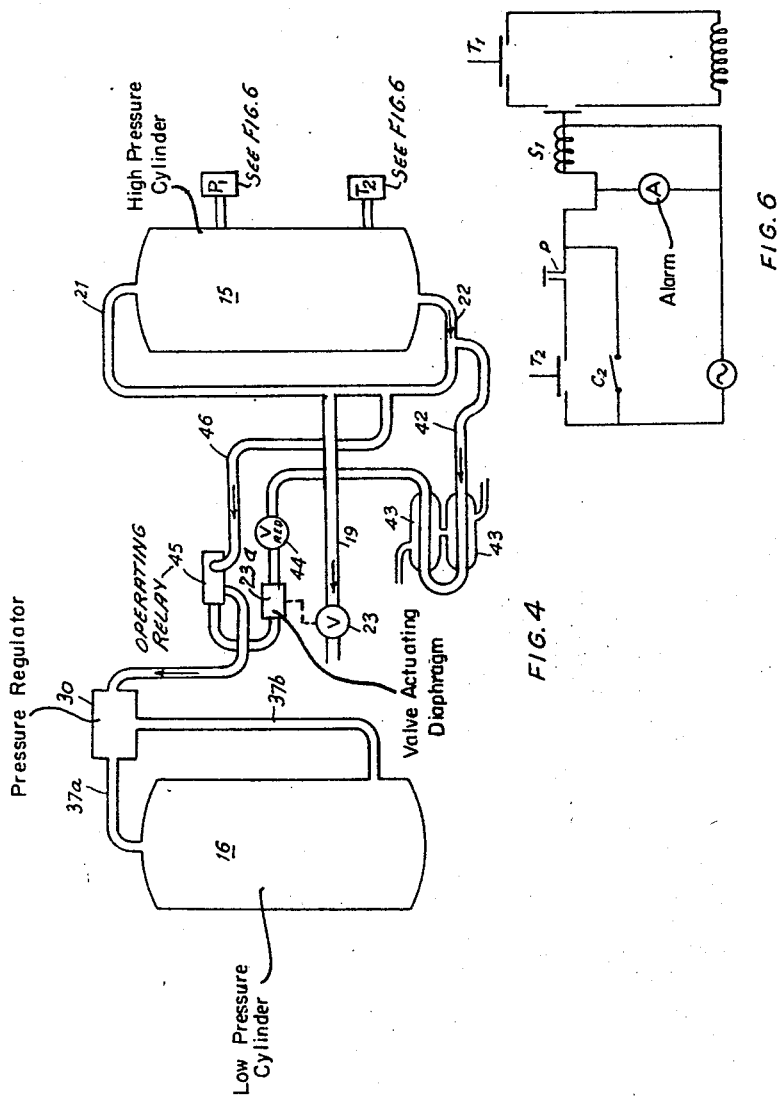

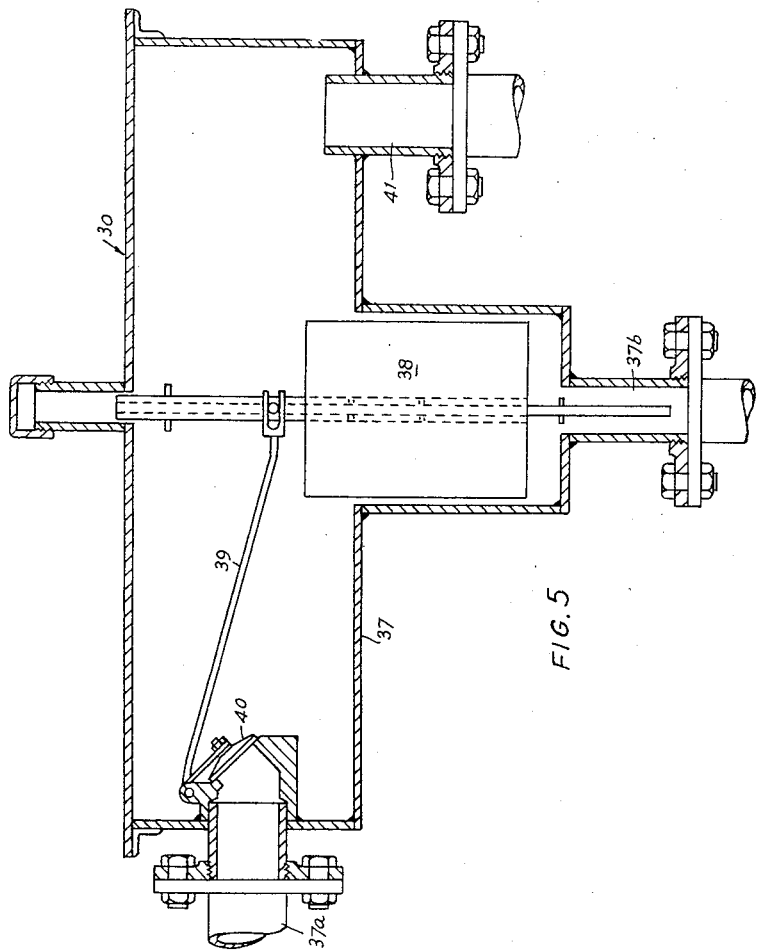

United States Patent Office 2,960,272
Patented Nov. 15, 1960

2,960,272

HEATING SYSTEMS

Jack N. Saunders, Wilmslow, England
(2 Sunny Bank, Holly Road, Cheshire, England)

Filed Aug. 17, 1956, Ser. No. 604,736

12 Claims. (Cl. 237—8)

This invention concerns heating systems of the type (hereinafter described as "the type referred to") which in operation are pressurized to enable the circulating liquid medium usually water to be used at a temperature above its normal boiling point i.e. its boiling point at atmospheric pressure. The liquid medium may be employed for example, for space heating purposes or for an industrial process.

The object of the present invention is to provide an improved control means for a system of the type described, especially having regard to economy and operative safety.

According to the present invention, control means for a heating system of the type referred to includes closed high pressure and low pressure containers, the high pressure container being adapted for connection to the heating circuit of the system and to the low pressure container, means in the connection between the high pressure and the low pressure containers so responsive to the pressure in a gas-filled space above the liquid level in the high pressure container as to open to allow flow of liquid on expansion thereof into the low pressure container (which is arranged to be capable of accommodating all the expansion liquid) from the heating circuit and the high pressure container, and to cause flow of liquid on contraction thereof from the low pressure container to the heating circuit and the high pressure container, whereby a substantially constant liquid level and pressure may be maintained in the high pressure container over a desired range of operating temperatures, and means for maintaining a substantially constant pressure in a gas-filled space above the liquid level in the low-pressure container.

The terms "high pressure" and "low pressure" have the meanings which would normally be given to them in this particular art, that is, respectively, not less than about fifty pounds per square inch gauge, and between about twelve pounds per square inch absolute and about twenty pounds per square inch absolute.

The invention will now be described further, by way of example, with reference to the accompanying drawings, in which:

Fig. 4 shows diagrammatically one part of the control means in more detail,

Fig. 5 is a sectional elevation of another part of the control means, and

Fig. 6 is a circuit diagram of a shut down and alarm arrangement.

The domestic or industrial heating system now to be described (the working fluid being water) comprises, broadly, the heating circuit porper, and the control means.

Figure 1:
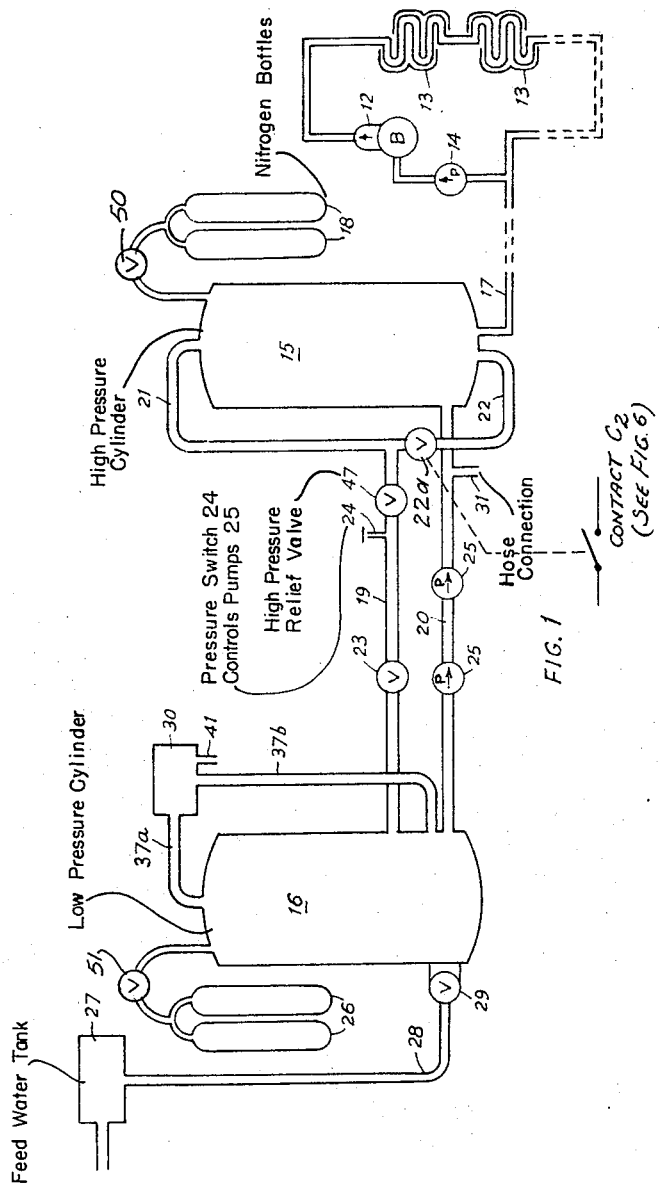
Fig. 1 shows diagrammatically the layout of a pressurized heating system with a control means constructed in accordance with the present invention.
Figure 2:
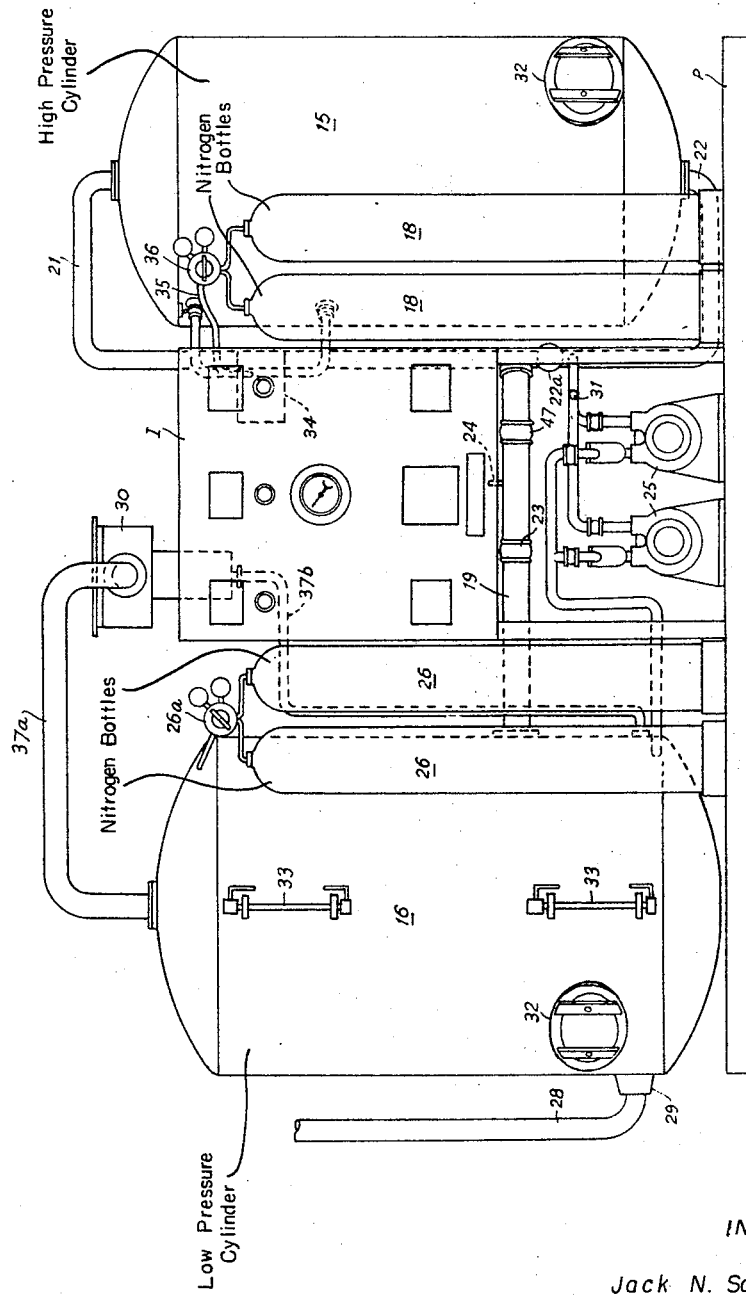
Fig. 2 is a front elevation of the control means.
Figure 3:
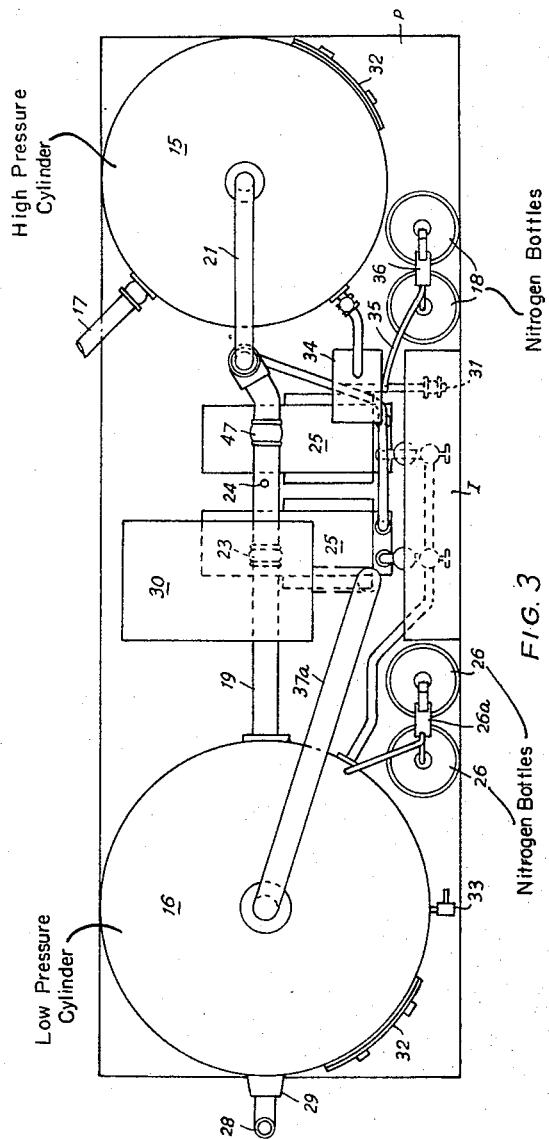
Fig. 3 is a plan view corresponding to Fig. 2.

The heating circuit which is of generally conventional type is shown at the right of Fig. 1 and includes an automatically stoked boiler 12, radiators 13 or like heating means, and circulating pump 14.

The control means or pressurization unit, although occupying the greater part of Fig. 1 for clarity actually is economical of space and is mounted for convenience on a platform. Its main components are a high pressure cylinder 15 (of 400 gallons capacity) and a low pressure cylinder 16 (of 600 gallons capacity). These capacities are those of the particular cylinders being described and, in general, will depend on the nature of the heating circuit and its operating temperature and pressure. The high pressure cylinder 15 is connected to the heating circuit by conduit 17. High pressure nitrogen bottles 18 are provided for feeding the upper part of the high pressure cylinder 15. Between the two cylinders 15, 16, are two pipe connections 19, 20. The first connection 19 joins the high pressure cylinder 15 by a conduit 21 at the top thereof and a conduit 22 at the bottom thereof; and joins the low pressure cylinder 16 near the bottom thereof. The connection 19 includes an adjustable pressure-controlled valve 23 capable of arresting flow or allowing it in one direction through the valve only (in response to pressure, as will be more fully described hereinafter), and a pressure responsive element 24 operating a switch for pumps 25 which are provided in the other connection 20. The low pressure cylinder 16 has high pressure nitrogen bottles 26 for feeding the upper part thereof. It also has a feed water tank 27 connected to the lower part thereof by conduit 28, a float-controlled valve 29 being provided in this conduit. A special pressure-regulator 30 (described in more detail hereinafter) is provided to keep the pressure in the upper part of the low pressure cylinder 16 substantially constant.

The general mode of operation of the system illustrated diagrammatically in Fig. 1 will now be set out.

Firstly the system (i.e. the heating circuit and the high pressure cylinder) is supplied with cold water (for this purpose a hose connection 31 is provided) and the low pressure cylinder primed. Then, the pumps 25 are switched on under the control of the element 24 to pressurize the high pressure cylinder and the heating circuit. The pressure of the system being described was designed to be 120 p.s.i. to give a working temperature of 300–320° F. The gas above the water in the high pressure cylinder 15 is initially air although eventually replaced by nitrogen as the air goes into solution. The use of air, initially, is thought to prevent certain types of bacteria establishing themselves in the system.

The boiler 12 is finally brought into operation and as the water expands due to increase in temperature, the pressure in the gas-filled space of the high pressure cylinder tends to increase still further. Any substantial further increase of such pressure is prevented because the valve 23 is pressure-responsive and therefore comes into operation and the excess volume of water passes through connection 19 to the low pressure cylinder 16, which is designed to accommodate all the expansion water from the rest of the system caused by a rise in temperature from the initial filling temperature (say 50° F.) to the top working temperature. The system is now in full operation. On reduction of temperature the water contracts tending to reduce the pressure in the high pressure cylinder. The pumps 25, which are now under automatic control of the element 24, come into operation on drop of pressure below a predetermined normal pressure and feed water back from the low pressure cylinder 16 to the high pressure cylinder 15 to maintain the pressure and volume in the latter substantially constant. It will be clear therefore, that no make-up water, other than to replace losses due to leakage through glands and other incidental losses is required. Any undue rise in the water level in the high-pressure cylinder, which would be due to loss of gaseous pressure is corrected by make-up of the gas volume, as described later.

Having thus described the basic arrangement and mode of operation the various parts of the system will now be described in more detail, referring particularly to Figs. 2 to 6.

The cylinders 15, 16 mounted on platform P along with instrument panel I are provided with such access doors 32 and water level gauges 33 as may be necessary or desirable.

The nitrogen feed from the nitrogen bottles 18 to the high pressure cylinder 15 for make-up of the gas volume is controlled by means of a special float valve disposed in a float chamber 34 the upper region of which is connected to the high pressure cylinder above the maximum water level and the lower region of which is connected to the high pressure cylinder below the maximum water level. A nitrogen feed pipe 35 enters the float chamber 34 and has an outlet therein through a Schrader (Registered Trademark) valve the operation of which is controlled by the float. The arrangement and disposition of the float and valve within the float chamber 34 is such that on decrease of pressure the consequent increase of water level by the action of pump 25 started by such loss of pressure immediately causes the float to rise and depresses the pin of the Schrader (Registered Trademark) valve to allow nitrogen to pass from the bottles 18, through a reducing valve 36, into the chamber 34 and into the upper part of the cylinder 15 to restore the pressure and lower the water level, through the pressure-responsive valve 23.

The low pressure cylinder 16 is sealed to prevent aeration of the water and is charged with nitrogen at atmospheric or slightly higher pressure before the system is started up. It is desirable however that there should be no material variation in the nitrogen pressure in this container. That is to say, as the level rises in the low pressure cylinder 16, the build-up of a back pressure in the gas-filled space above the liquid level should be prevented, and on reduction of the water level reduction of pressure in this space below atmospheric should be substantially prevented. Undue increase in pressure is avoided by the provision of the special regulator 30 associated with the low pressure cylinder 16. The regulator 30 (Fig. 5) has its main working parts accommodated in a generally T-shaped housing 37 having a pipe connection 37a from one end of its cross member to the upper part of the low pressure cylinder 16 and a pipe connection 37b from the bottom of its stem to the lower part of the low pressure cylinder 16. The stem acts as a cylinder for a loose-fitting piston 38 which is connected by means of a suitable linkage 39 to a closure 40 over the end of the connection 37a between the housing 37 and the upper part of the low pressure cylinder 16. The dimensions and shapes of the various parts and the design of the linkage are such that the low pressure cylinder 16 and the connection 37b from its lower part to the housing 37 form a U-tube of such characteristics that as the water level in the low pressure cylinder 16 rises the resistance to compression of the nitrogen above the water causes the level in the other "limb" of the U-tube to rise further than the cylinder itself (the housing being open to the atmosphere through an overflow pipe 41) and eventually to such a level that the piston or float 38 is lifted to operate the linkage 39 and open the closure 40 to release nitrogen from the low pressure cylinder 16 to relieve the pressure. Provision is also made to deal with the eventuality of the piston 38 sticking, because if this should happen the water soon reaches the cross-member of the housing 37 which is of substantial cross-sectional area and the rate of pressure increase is limited and eventually arrested as the water flows away via the overflow pipe 41 in the housing 37 provided for the purpose. Water lost as just described, or for any untoward reason is eventually replaced from the supply tank 27 operated by an ordinary float valve. Drop in nitrogen pressure in the low pressure cylinder 16 is compensated for by the nitrogen feed from the bottles 26, which is controlled by a reducing valve 26a (Fig. 2) which, on drop of liquid level within the low pressure container and consequent reduction in pressure therein operates to allow nitrogen to pass from the bottles 26 to the low pressure cylinder to build up the pressure again. Should the nitrogen supply fail when water is being drawn from the low pressure cylinder then the amount of vacuum which arises is only that represented by the difference in level between the water in the two "limbs" of the U-tube, since if the connection 37b became empty, air would then pass therethrough to enter the cylinder 16.

To operate the valve 23 satisfactorily which valve would normally be a relay-operated valve and normally require an actuating pressure of about 12 to 15 p.s.i. the special arrangement illustrated in Fig. 4 may be adopted if, as is often the case, it is not possible or convenient to provide for such a pressure, by, for instance, the water supply from a static head tank.

The valve 23 is of the diaphragm relay type, and water is bled off from the high pressure cylinder by a conduit 42 which passes through a cooling jacket 43 fed from the supply tank 27 of the low pressure cylinder 16. The actuating pressure supply passes through a reducing valve 44 and over the actuating diaphragm 23a of the valve 23 and then to an operating relay 45 for the valve 23 and finally discharges into the housing 37 of the regulator 30 to avoid loss. The relay 45 is arranged to operate when the pressure in the high pressure cylinder 15 transmitted through a further conduit 46 exceeds normal working pressure. When relay 45 operates, flow through the conduit 42 and into regulator 37 is terminated. This causes a build-up of pressure on the diaphragm of the valve 23 which operates to allow water to pass into the low pressure cylinder 16 as previously described. When the pressure in the high pressure cylinder 15 falls again the flow recommences and the valve 23 closes again.

It is very desirable that an emergency alarm and close-down arrangement should be provided to cope with two eventualities.

The first of these is a substantial fall in pressure below normal working pressure in the high pressure cylinder 15 while the water temperature remains high. Clearly no danger arises if the drop is not more than one or two pounds per square inch but if the pressure drops more than say five pounds per square inch below normal the situation becomes potentially dangerous. Such conditions may arise for example if the high pressure cylinder 15 or any part of the external system develops a substantial leak. The eventuality may be met by providing an electrical control circuit for the boiler which includes a temperature-responsive switch and a pressure-responsive element operating a switch in series. The element would be designed so that the pressure-responsive switch would be open when the pressure is higher than what has been decided to be a safe level whilst the temperature-responsive switch would close at temperatures normal or higher. The circuit, which would therefore be completed in the circumstances envisaged, would be arranged to operate a relay or like means which in turn would cause the boiler to be shut down immediately, by for example, the movement of a hand reset solenoid switch operating on the circuit controlled by the temperature-responsive switch. This circuit will usually in turn control the firing mechanism of the boiler. The closing of the circuit could also be arranged to operate an alarm either visual or audible, or both. A suitable circuit is illustrated in Fig. 6 where $T_1$ is the boiler temperature-responsive switch, $S_1$ the hand reset solenoid switch, P the switch controlled by pressure-responsive element, $T_2$ the alarm and control temperature-responsive switch, and A the alarm.

The second eventuality is a fall in water level in the high pressure cylinder 15 due, for example to the failure of the nitrogen feed control. This may be provided for by including a magnetic float valve 22a (Fig. 2) in the conduit 22 designed to operate if the water level falls below a certain value. The valve would be arranged to close the normally open switch $C_2$ (Fig. 6) to close down the boiler and operate the alarm.

Finally a high pressure relief valve 47 may be included in connection 19 (Fig. 1).

The advantages offered by the control system described hereinbefore are several. Hitherto in pneumatically pressurized systems it has been usual for a high pressure cylinder to be of large dimensions to deal with the expansion liquid. This is a costly arrangement. In the system according to the invention the high pressure cylinder can be made of smaller dimensions, and a less costly low pressure cylinder provided to deal with the expansion liquid. In some prior systems an open low pressure storage tank has been used and this has led to contamination and aeration of the water. In the system according to the invention the low pressure cylinder is closed and the nitrogen atmosphere which is maintained above the water therein prevents any undesirable effects.

A further substantial advantage which is obtained by the system described is that its capacity can be simply extended by providing additional cylinders. Furthermore the control system is compact, virtually self-contained, and completely sealed, and it may include adequate safety devices at small additional cost.

What I claim is:

1. In a high pressure fluid type heating system of the kind wherein a heating circuit is connected to a high pressure container the combination with said high pressure container of a control means for said system including, a low pressure container, means for connecting said low pressure container to said high pressure container, said connection means including valve means controlled by the pressure in a gas-filled space above the liquid level in the high pressure container for permitting flow of liquid on expansion thereof into the low pressure container which is of a capacity capable of accommodating all the expansion liquid from the heating circuit and the high pressure container, said connection means further including pump means being controlled by a decrease in pressure in said high pressure system cylinder below a predetermined value on contraction of said fluid for pumping said fluid from the low pressure container to the heating circuit and the high pressure container, whereby a substantially constant liquid level and pressure may be maintained in the high pressure container over a desired range of operating temperatures, and means for maintaining a substantially constant pressure in a gas-filled space above the liquid level in the low pressure container.

2. Control means as claimed in claim 1 in which the connection between the high pressure and low pressure containers comprises a first pipe controlled by a valve designed to be open on increase of pressure in the high pressure container due to expansion of the liquid and allow flow therefrom to the low pressure container, and a second pipe in which are pump means controlled by a switch operated by a pressure-responsive element so as to come into operation on decrease of pressure in the high pressure container due to contraction of the liquid and cause flow therefrom to the high pressure container.

3. Control means as claimed in claim 2 in which said valve is of the diaphragm type, and means is provided for bleeding off liquid from the high pressure cylinder, cooling same, and causing it to pass through a reducing valve over the actuating diaphragm of the valve, through an operating relay, and back into the low pressure part of the system, said relay being adapted to operate when the pressure in the high pressure cylinder exceeds normal working pressure and arrest the flow whereupon the pressure will then build up at the diaphragm to open the valve.

4. Control means as claimed in claim 1, in which the low pressure container has means for maintaining a pressure therein of about one atmosphere.

5. Control means as claimed in claim 4 in which said means for maintaining pressure includes a pressure regulator comprising a housing having an upper part of substantial dimensions open to the atmosphere, a stem connected to a vertical pipe leading from the lower part of the low pressure container, a pipe connecting the upper part of the housing and the upper part of the low pressure cylinder, a closure for the pipe, within the housing, a loose fitting piston in the stem, and a linkage between the piston and the housing adapted on rise of liquid level within the low pressure container and consequently rise of liquid level within the stem and movement of the piston to open said closure to relieve the pressure within the low pressure container.

6. Control means as claimed in claim 4, in which said means for maintaining pressure includes a reducing valve adapted, on drop of liquid level within the low pressure container and consequent reduction in pressure therein to open the pressure supply from containers for a gas under pressure, to the low pressure cylinder to build up the pressure again.

7. Control means as claimed in claim 1, further comprising containers for gas at high pressure, a float chamber associated with the high pressure container, and a valve in the float chamber adapted to be open on increase of liquid level in the high pressure cylinder above the working level, and consequently increase of liquid level in the float chamber, to allow pressure gas from said containers to pass to the high pressure container to restore the pressure and water level.

8. Control means as claimed in claim 1, comprising a temperature-responsive switch and a pressure-responsive switch in series in a circuit, said pressure-responsive switch being constructed to close only when the pressure in the high pressure container is dangerously less than normal working pressure and the temperature-responsive switch being designed to be closed when the temperature in the external heating circuit is normal or higher, said circuit when closed being adapted to shut down the heating means.

9. Control means as claimed in claim 8, in which said circuit when closed is adapted to operate a visual and/or audible alarm.

10. Control means as claimed in claim 1, in which there is, associated with the high pressure cylinder, a magnetic float valve adapted to operate if the liquid level falls by a given amount, and to close a circuit controlling the heating means to shut same down.

11. Control means as claimed in claim 10, in which said circuit when closed is adapted to operate a visual and/or audible alarm.

12. Control means as claimed in claim 1, in which a high pressure relief valve is provided for the high pressure container.

References Cited in the file of this patent

UNITED STATES PATENTS

| 783,145 | Sinclair | Feb. 21, 1905 |
| 2,215,819 | Ludeman | Sept. 24, 1940 |

FOREIGN PATENTS

| 424,271 | Great Britain | Feb. 15, 1935 |